(12) United States Patent
Hjertberg et al.

(10) Patent No.: US 7,093,910 B2
(45) Date of Patent: Aug. 22, 2006

(54) FASTENING DEVICE FOR CONNECTING SPOKES TO RIMS

(76) Inventors: Eric Alan Hjertberg, No. 487, Guojung Rd., Dali City, Taichung (TW); Douglas Chiang, No. 487, Guojung Rd., Dali City, Taichung (TW)

( * ) Notice: Subject to any disclaimer, the term of this patent is extended or adjusted under 35 U.S.C. 154(b) by 0 days.

(21) Appl. No.: 11/006,527

(22) Filed: Dec. 8, 2004

(65) Prior Publication Data

US 2006/0119170 A1 Jun. 8, 2006

(51) Int. Cl.
*B60B 21/06* (2006.01)
*B60B 9/26* (2006.01)

(52) U.S. Cl. .................................. 301/58; 301/104
(58) Field of Classification Search ................ 301/55, 301/58–59, 61, 79, 104, 105.1, 110.5, 110.6, 301/95.101; 29/894.33–894.333
See application file for complete search history.

(56) References Cited

U.S. PATENT DOCUMENTS

| 4,040,671 | A | * | 8/1977 | Hersh | 301/58 |
| 4,729,605 | A | * | 3/1988 | Imao et al. | 301/104 |
| 5,064,250 | A | * | 11/1991 | Yashiro et al. | 301/55 |
| 5,110,190 | A | * | 5/1992 | Johnson | 301/55 |
| 6,409,278 | B1 | * | 6/2002 | Nakajima | 301/59 |
| 6,886,892 | B1 | * | 5/2005 | Chiang et al. | 301/58 |

\* cited by examiner

*Primary Examiner*—Jason R. Bellinger

(57) ABSTRACT

A bicycle rim includes a plurality of recesses defined in an inner periphery thereof and a through hole is defined through the rim and shares a common axis with the recess corresponding thereto. A plurality of spokes each have a threaded hole defined in a first end thereof which is fitted in one of the recesses and a plurality of bolts extend through the through holes and are threadedly connected to the threaded holes in the spokes. The through holes are small so that they do not reduce the structural strength of the rim and the end of each spoke is fitted in the recess to further position the spokes to the rim. A second end of each of the spokes is connected to a hub by extending a bolt through the hub and threadedly connected to the second end of each spoke.

4 Claims, 5 Drawing Sheets

FASTENING DEVICE FOR CONNECTING SPOKES TO RIMS

FIELD OF THE INVENTION

The present invention relates to a combination of a rim and spokes which is secured to the rim by bolts and each spoke is engaged with a recess in the rim and the bolt extends through the rim and is threadedly connected to the rim.

BACKGROUND OF THE INVENTION

A conventional way for connecting spokes to a bicycle rim is to drill holes through the rim and bolts extend through the holes and are connected to the spokes. In order to have a light in weight of the combination of the rim and the spokes, the bolts and the spokes are made by aluminum. The holes are drilled large enough to accommodate the bolt and this reduces the structural strength of the rim. Furthermore, the aluminum bolts cannot bear the stress coming from the load of the bicycle and the reaction force from the ground, so that the bolts are often broken.

The present invention intends to provide a safety and reliable structure for securing the spokes to the rim. The rim includes a plurality of recesses defined in an inner periphery thereof and a through hole is defined through an inside of each recess. An end of a spoke is engaged with the recess and the bolt is threadedly connected to the end of the spoke. The through holes are smaller than the hole of the conventional rim so that the rim is strong enough to bear the load and the stress during riding.

SUMMARY OF THE INVENTION

The present invention relates to a bicycle wheel which includes a rim, a hub and a plurality of spokes connected between the rim and the hub. The rim has two sidewalls and a connection portion is connected between the two sidewalls. A plurality of recesses are defined in an inner periphery of the connection portion of the rim and a through hole is defined through the connection portion and shares a common axis with the recess corresponding thereto. The spokes each have a threaded hole defined in a first end thereof which is engaged with one of the recesses. A plurality of bolts extend through the through holes and are threadedly connected to the threaded holes in the spokes. The second ends of the spokes are connected to the hub.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
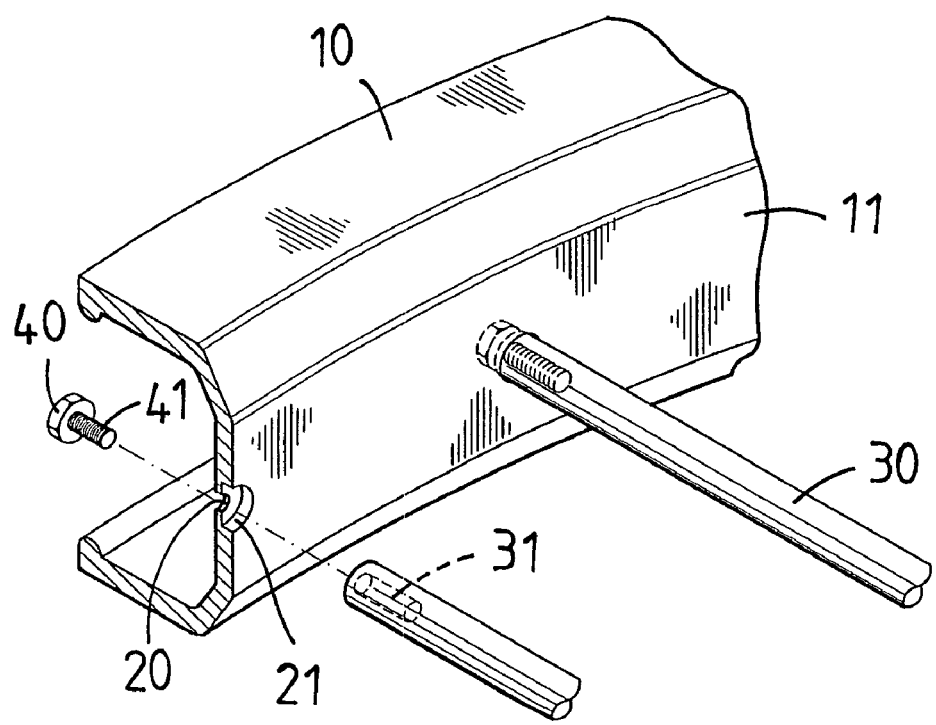
FIG. 1 is an exploded view to show the rim, the spokes and the bolts of the present invention.
Figure 2:
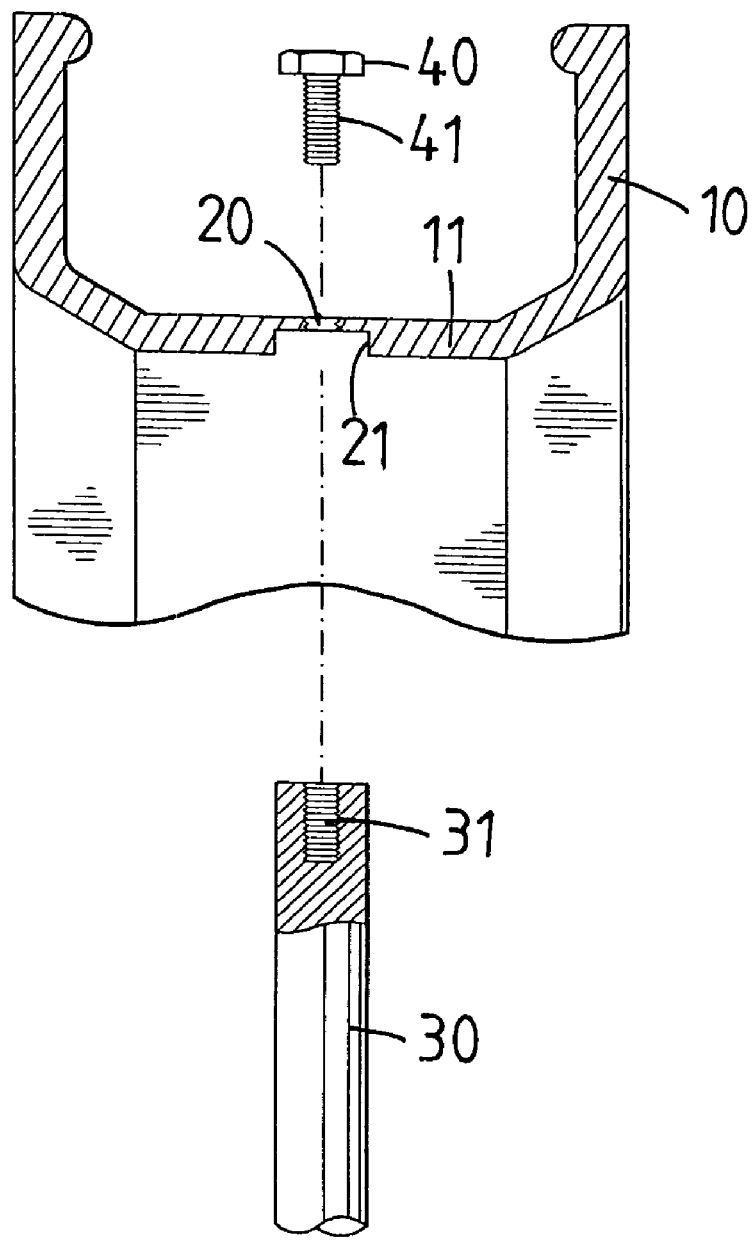
FIG. 2 is a cross sectional view to show the rim, the spokes and the bolts of the present invention.
Figure 3:
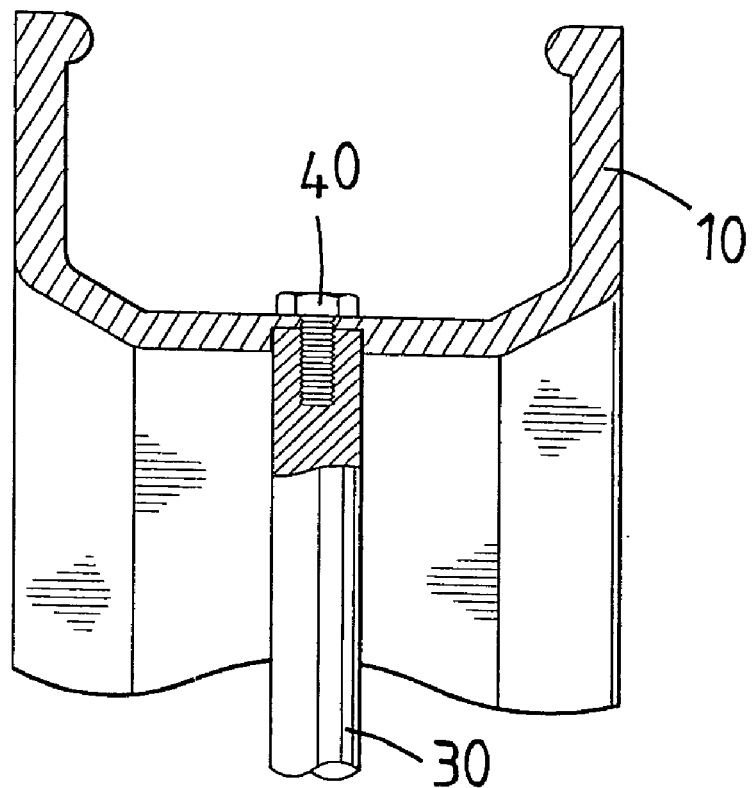
FIG. 3 is a side view to show the combination of the rim, the spokes and the bolts of the present invention.

Referring to FIGS. 1 to 4, the bicycle wheel of the present invention comprises a rim, a plurality of spokes 30 and a hub 50. The rim includes two sidewalls 10 and a connection portion 11 is connected between the two sidewalls 10, each sidewall 10 includes a lip on an inside thereof so as to position a tire which is not shown. A plurality of recesses 21 are defined in an inner periphery of the connection portion 11 of the rim and a through hole 20 is defined through the connection portion 11 and shares a common axis with the recess 21 corresponding thereto.

The spokes 30 each have a first threaded hole 31 defined in a first end thereof which is engaged with one of the recesses 21, and a second end of each spoke 30 is connected to the hub 50. An inner diameter of each of the recesses 21 is the same as an outer diameter of the first end of each of the spokes 30 so that the first end of each spoke 30 is fitted in the recess 21 corresponding thereto.

A plurality of first bolts 40 each include a head and a shank 41 which is sized to extend through the through holes 20 and threadedly connected to the first threaded hole 31 in the spoke 30. The head of each first bolt 40 is larger than the through holes 20.

Figure 4:
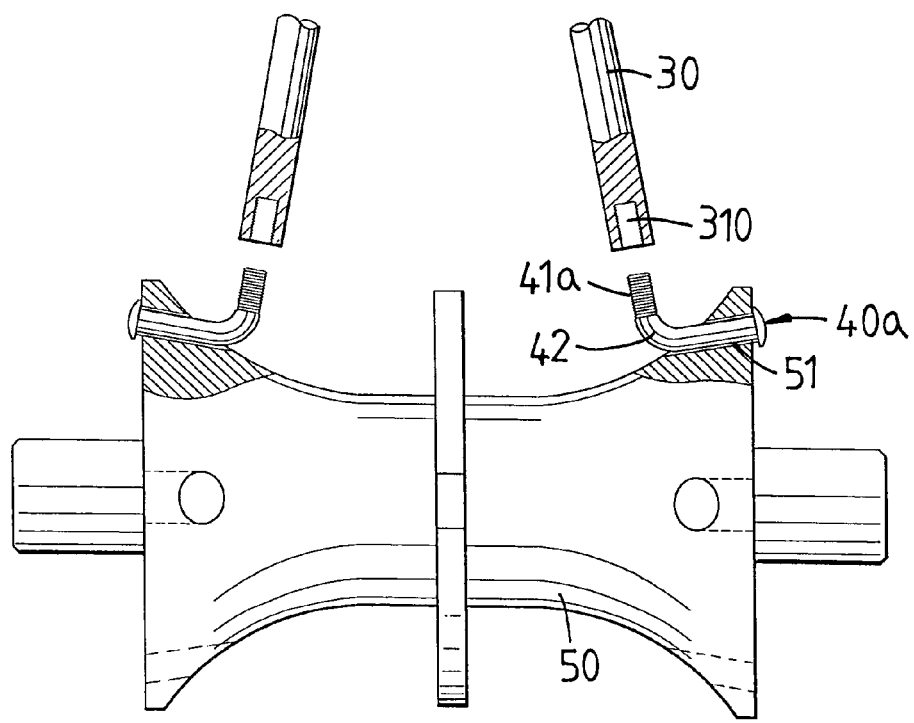
FIG. 4 shows the spokes are to be connected to the hub.

Referring to FIG. 4, the hub 50 includes a plurality of passages 51 defined therethrough and a plurality of L-shaped second bolts 42 extend through the passages 51. Each second bolt 42 includes a head 40a which is larger than the diameter of each passage 51, and a threaded section 41a which is oriented toward a second threaded hole 310 defined in the second end of each spoke 30 and connected with the second threaded hole 310 corresponding thereto.

Figure 5:
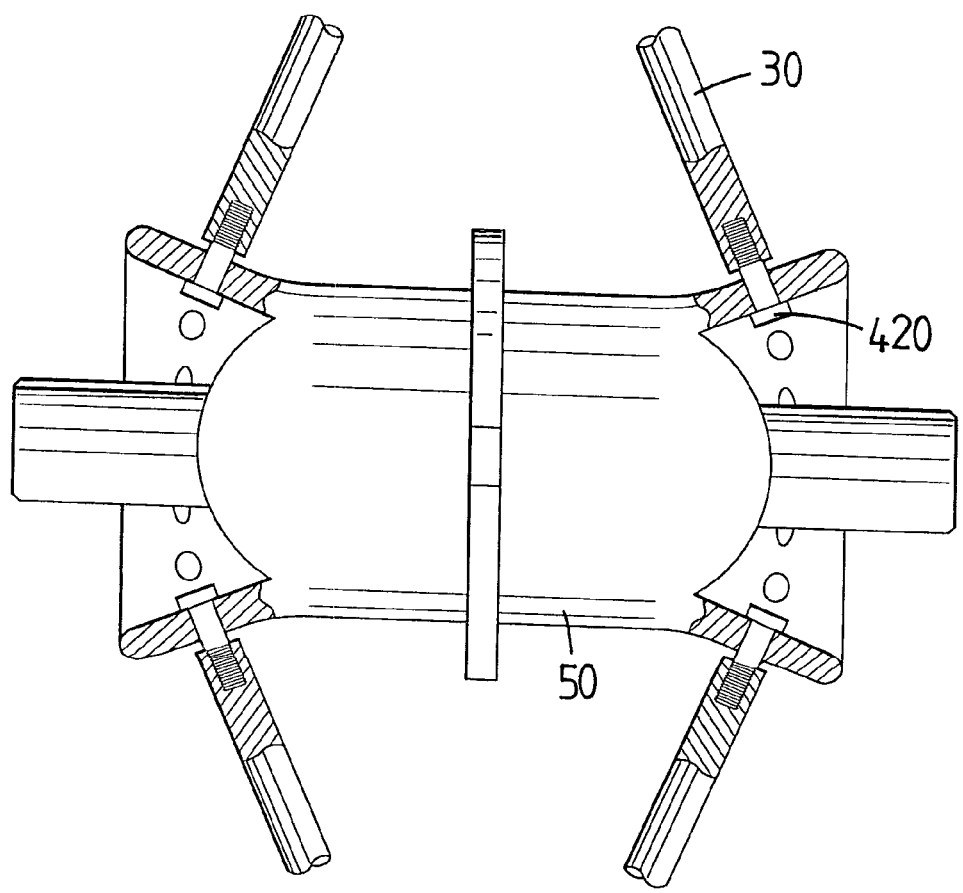
FIG. 5 shows another embodiment of the combination of the spokes and the hub.

Referring to FIG. 5 which shows another embodiment of the combination of the spokes 30 and the hub 50, wherein the hub 50 has two open ends and the second bolts 420 extend through the wall of the two open ends from an inside of the open ends and the second ends of the spokes 30 are threadedly connected to the second bolts 420. It is noted that the second bolts 420 are general bolts with straight shanks. The first and second bolts in the invention can be made by steel so as to provide a strong connection.

While we have shown and described the embodiment in accordance with the present invention, it should be clear to those skilled in the art that further embodiments may be made without departing from the scope of the present invention.

What is claimed is:

1. A bicycle wheel comprising:
   a rim including two sidewalls and a connection portion connected between the two sidewalls, a plurality of recesses defined in an inner periphery of the connection portion of the rim and a through hole defined through the connection portion, which shares a common axis with the recess corresponding thereto;
   a plurality of spokes each having a first threaded hole defined in a first end thereof which is engaged with one of the recesses, a second end of each spoke connected to a hub, and
   a plurality of first bolts extending through the through holes and threadedly connected to the first threaded holes in the spokes.

2. The bicycle wheel as claimed in claim 1, wherein an inner diameter of each of the recesses is the same as an outer diameter of the first end of each of the spokes.

3. The bicycle wheel as claimed in claim 1, wherein each of the first bolts includes a head, and a shank which is sized to extend through the through holes, wherein the head is larger than the through holes.

4. The bicycle wheel as claimed in claim 1, wherein the hub includes a plurality of passages defined therethrough and a plurality of second bolts extend through the passages, a second threaded hole defined in the second end of each spoke so as to be connected with the second bolt corresponding thereto.

* * * * *